United States Patent [19]

Rarity et al.

[11] Patent Number: 6,028,935
[45] Date of Patent: Feb. 22, 2000

[54] CRYPTOGRAPHIC RECEIVER

[75] Inventors: John G Rarity; Paul R Tapster, both of Malvern, United Kingdom

[73] Assignee: The Secretary of State for Defence in Her Britannic Majesty's Government of the United Kingdom of Great Britain and Northern Ireland, Farnborough, United Kingdom

[21] Appl. No.: 08/624,499

[22] PCT Filed: Sep. 23, 1994

[86] PCT No.: PCT/GB94/02067

§ 371 Date: Apr. 10, 1996

§ 102(e) Date: Apr. 10, 1996

[87] PCT Pub. No.: WO95/10907

PCT Pub. Date: Apr. 20, 1995

[30] Foreign Application Priority Data

Oct. 8, 1993 [GB] United Kingdom .................... 9320793

[51] Int. Cl.[7] ...................................................... H04L 9/12
[52] U.S. Cl. ................................. 380/21; 380/44; 380/49
[58] Field of Search ................................. 380/21, 49, 44

[56] References Cited

U.S. PATENT DOCUMENTS

| H1626 | 1/1997 | Kersey et al. | 370/479 |
|---|---|---|---|
| 4,303,861 | 12/1981 | Ekstrom | 250/370 |
| 4,754,131 | 6/1988 | Bethea et al. | 250/211 |
| 5,140,636 | 8/1992 | Albares | 380/54 |
| 5,191,614 | 3/1993 | LeCong | 380/49 |
| 5,243,649 | 9/1993 | Franson | 380/9 |
| 5,307,410 | 4/1994 | Bennett | 380/21 |
| 5,311,592 | 5/1994 | Udd | 380/9 |
| 5,515,438 | 5/1996 | Bennett et al. | 380/21 |

FOREIGN PATENT DOCUMENTS

| WO 95/07582 | 3/1995 | WIPO . |
|---|---|---|
| WO 95/07583 | 3/1995 | WIPO . |
| WO 95/07584 | 3/1995 | WIPO . |
| WO 95/07585 | 3/1995 | WIPO . |

OTHER PUBLICATIONS

Bennett, Charles H., "Quantum Cryptography Using Any Two Nonorthogonal States", Physical Review Letters, vol. 68, No. 21, May 25, 1992, pp. 3121–3124.

Townsend et al., "Enhanced Single Photon Fringe Visibility in a 10 km–Long Prototype Quantum Cryptography Channel", Electronics Letters, vol. 29, No. 14, Jul. 8, 1993, pp. 1291–1293.

*Primary Examiner*—Gail O. Hayes
*Assistant Examiner*—Hrayr Sayadian
*Attorney, Agent, or Firm*—Nixon & Vanderhye P.C.

[57] ABSTRACT

A cryptographic receiver (10) includes photon detectors (52, 54, 56, 58) arranged to detect photons arriving from filters (22) and (24). A fiber coupler (14) randomly distributes each received photon (16) from an optical fiber toone of two photon channels (18, 20). The filters (22, 24) are each unbalanced Mach–Zehner interferometers with a phase modulator (34, 44) in one arm (28, 38). The filters (22, 24) impose non-orthogonal measurement bases on photons within the respective channels (18, 20). A signal processor (60) derives a cryptographic key-code by analysis of signals received from the photon detectors (52, 54, 46, 58).

19 Claims, 6 Drawing Sheets

CRYPTOGRAPHIC RECEIVER

BACKGROUND OF THE INVENTION

1. Field of the Invention

The invention relates to a cryptographic receiver, and more particularly to a cryptographic receiver for a communications system in which a cryptographic key-code is derived by two parties as a result of an exchange of information between the two parties following measurement of individual photons.

2. Discussion of Prior Art

Cryptographic receivers incorporated within cryptographic communications systems have been described previously, for instance in International Application No. PCT/GB91/01352 with a Publication No. of WO92/04785, and by A. K. Ekert et al, in Physical Review Letters, vol 69, number 9, August 1992, pages 1293 to 1295. The communications systems described therein comprise two cryptographic receivers separated by some distance and a source of correlated photon pairs. The receivers each include a filter whose transmission characteristics are modulated in response to a respective control signal. Exchange of information about the control signals between the two receivers enables each one to derive a common key-code, available to the receivers only. This key-code enables further messages to be encrypted and transmitted using insecure communications links. These systems have the disadvantage that high speed modulators are required which have associated high transmission losses.

A cryptographic communications system based on a photon polarization measuring receiver has been described by A. Muller et al, in European Physics Letters, vol 23, 1993 pages 383 to 388. The receiver described therein comprises an electro-optic switch which switches photons between two channels, one of which contains a 45° rotator. The channels recombine and photon polarizations are separated by a polarization beam splitter before being detected.

SUMMARY OF THE INVENTION

It is an object of the present invention to provide an alternative form of cryptographic receiver.

The present invention provides a cryptographic receiver for receiving individual information carrying photons comprising:

(a) a first photon channel and a second photon channel;

(b) distributing means for distributing received photons between the first photon channel and the second photon channel;

(c) means in the first photon channel for imposing a first measurement basis on photons within the first photon channel;

(d) means in the second photon channel for imposing a second measurement basis on photons within the second photon channel, the first and second measurement bases being non-orthogonal;

(e) photon detecting means for detecting received photons and for providing output signals upon detection of such photons; and (f) signal processing means for receiving said output signals and signals from an external source and for generating a cryptographic key-code from a combination of said output signals and said signals from an external source such that the receiver and the external source share an identical key-code, characterized in that (i) the distributing means distributes received photons randomly between the first and second photon channels without the requirement for a control signal, and (ii) the output signals from the photon detecting means are indicative of the respective measurement basis imposed on each received photon.

The invention provides the advantage that a high speed modulator is not required, high speed modulators having associated high transmission losses. Another advantage is that transmission rates may be higher than the prior art receivers.

The cryptographic receiver may be arranged to receive photons where the information is carried in the form of a phase relationship. The receiver may include unbalanced Mach-Zehnder interferometers whose transmission characteristics are dependent on the photon wavelength. The cryptographic receiver may be arranged alternatively to measure the polarization of received photons, the polarization state carrying the information.

The cryptographic receiver of the invention may be incorporated within a communications system having a second cryptographic receiver of the invention, each receiver providing a common key-code to a respective party. This arrangement provides the advantage of enhanced security since neither party provides a control signal for their receiver, such signals being vulnerable to interception.

BRIEF DESCRIPTION OF THE DRAWINGS

Embodiments of the invention will now be described, by way of example only, with reference to the accompanying drawings in which.

DETAILED DISCUSSION OF PREFERRED EMBODIMENTS

Figure 1:
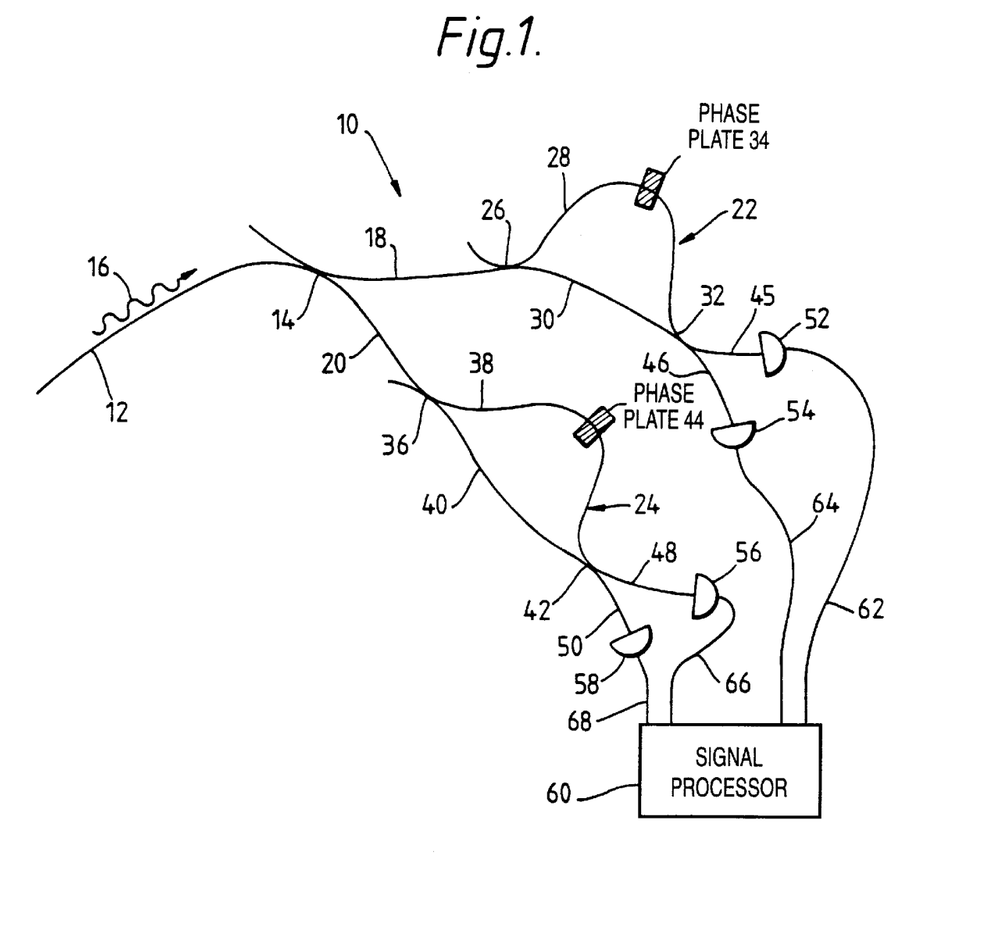
FIG. 1 schematically illustrates a cryptographic receiver of the invention.

Referring to FIG. 1, there is shown schematically a cryptographic receiver of the invention indicated generally by 10. The receiver 10 is arranged to receive photons from a remote source (not shown) along fibre optic guide 12. A fibre coupler 14 couples incoming photons, indicated by arrow 16, randomly to one or other of two channels 18 and 20. The fibre coupler 14 is a beamsplitter arranged to distribute photons to channel 18 and channel 20 on a random basis. The probabilities of the photons being coupled to either channel 18 or channel 20 are substantially equal. Both of the channels 18 and 20 are fibre optic guides. The channels 18 and 20 lead to filters 22 and 24 respectively.

The filter 22 comprises a 50/50 fibre coupler 26, similar to the fibre coupler 14, which couples photons randomly to either a long fibre path 28 or a short fibre path 30. These paths recombine at a further 50/50 fibre coupler 32. A phase plate 34 is incorporated in the long fibre path 28. The phase plate 34 is set to retard the phase of photons passing along the path 28 by $(2n\pi \pm \pi/2)$ radians where n is an integer. The filter 24 is similar to the filter 22 in that it has a 50/50 fibre coupler 36, a long fibre path 38, a short fibre path 40 and a second 50/50 fibre coupler 42. The long fibre paths 28 and 38 are of equal length as are the short fibre paths 30 and 40. A phase plate 44 is inserted into the long fibre path 38 of the filter 24 and is set to give a phase shift of 2 mm radians, where m is an integer, to photons passing along the path 38. In the simplest case, n and m are both equal to zero. The filter 22 then has a phase plate 34 which imposes a $\pi/2$ phase shift and the filter 24 has a phase plate which imposes a 0 phase shift. The filters 22 and 24 are thus set to form two non-orthogonal measurement bases. Non-orthogonal states are defined in terms of projection operators in a paper by C. H. Bennett in Physical Review Letters, Volume 68, Number 21, May 1992, pages 3121 to 3124 where, at page 3122, Bennett states "Let $|u_0\rangle$ and $|u_1\rangle$ be two distinct, nonorthogonal states, and let $P_0 = 1 - |u_1\rangle\langle u_1|$ and $P_1 = 1 - |u_0\rangle\langle u_0|$ be (non-commuting) projection operators onto subspaces orthogonal to $|u_1\rangle$ and $|u_0\rangle$, respectively (note reversed order of indices). Thus $P_0$ annihilates $|u_1\rangle$, but yields a positive result with probability $1 - |\langle u_0|u_1\rangle|^2 > 0$ when applied to $|u_0\rangle$, and vice versa for $P_1$."

The two fibre couplers 32 and 42 couple photons to pairs of output channels 45 and 46, and 48 and 50 respectively. Each of the output channels 45, 46, 48 and 50 are terminated by respective photon detectors 52, 54, 56 and 58. Each photon detected by the detectors 52, 54, 56 and 58 generates an electrical pulse. The detectors 52, 54, 56 and 58 are connected to a signal processor 60 by respective wires 62, 64, 66 and 68. The filters 22 and 24, the output channels 45 to 50 and the photon detectors 52 to 58 constitute discriminating means.

The filters 22 and 24 are unbalanced Mach-Zehnder interferometers. A single incident photon entering the receiver 10 as indicated by arrow 16 passes randomly to either filter 22 or filter 24. In consequence, photons input at 12 to the device 10 become randomly distributed between the filters 22 and 24. The long fibre paths 28 and 38 have a path length which is an amount l greater than that of the short fibre paths 30 and 40. Depending on the wavelength of the photon entering either filter 22 or 24 and the path difference l, the photon will be detected at one of the photon detectors 52, 54, 56 or 58. Which detector detects the photon is dependent on whether constructive or destructive interference occurs at the fibre couplers 52 or 42. When the wavelength of the incident photon is uncertain, with a coherence length less than l, the photon will appear randomly in one of the detectors 52, 54, 56 and 58. Operation of the receiver 10 incorporated into a communications system will be described later.

Figure 2:
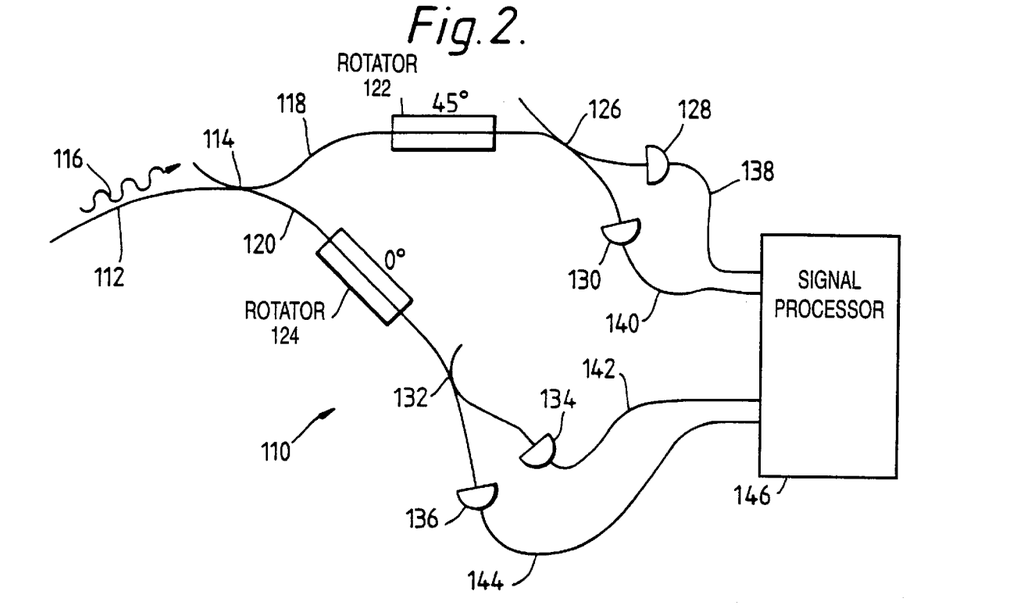
FIG. 2 schematically illustrates a cryptographic receiver of the invention in the form of a passive polarization receiver.

Referring now to FIG. 2 there is shown an alternative embodiment of the invention in the form of a passive polarization receiver indicated generally by 110. The receiver 110 is arranged to receive polarized photons from a distant source (not shown) along fibre optic guide 112. A polarization maintaining and polarization insensitive fibre coupler 114 couples incoming polarized photons, indicated by arrow 116, randomly to one of channels 118 and 120. Channels 118 and 120 are polarization maintaining fibre optic guides which lead to respective polarization rotators 122 and 124. Rotator 122 is set to rotated the polarization of photons passing through it by 45° and rotator 124 is set to rotate the polarization of photons passing through it by 0°. Channel 118 then leads to a polarizing beamsplitter 126. Depending on the polarization of photons entering the beamsplitter 126, the photons are either output towards photon detector 128 or photon detector 130. The channel 120 leads from the rotator 124 to a polarizing beamsplitter 132 like to beamsplitter 126. The beamsplitter 132 has two output directions which lead to photon detectors 134 and 136. The rotators 122 and 124 impose non-orthogonal measurement bases on photons within the channels 118 and 120 respectively.

The photon detectors 128, 130, 134 and 136 convert photons into electrical pulses which are passed along respective wires 138, 140, 142 and 144 to signal processor 146. Operation of the receiver 110 incorporated into a communications system will be described later.

The channel 120 of the receiver 110 may be arranged so as to include a delay loop. In such an embodiment, the two polarizing beamsplitters 126 and 132 are replaced by a single polarizing beam splitter which has two input channels corresponding to the channels 118 and 120. The delay loop in channel 120 enables the signal processor to identify which channel a photon passed along by measuring its arrival time at the polarizing beamsplitter. Instead of a 0° rotator such as rotator 124, the channel 120 may be replaced by a length of polarization maintaining fibre optic waveguide, provided it imposes a measurement basis on photons within the channel 120 which is non-orthogonal to the measurement basis imposed by rotator 122 in channel 118. The use of two rotators simplifies the operation of the receiver 110 since they enable the performance of the receiver to be "trimmed" to maximize performance. Such "trimming" is achieved by sightly altering the rotation angles away from the 0° and 45° positions to account for any misalignment of the polarizing beam splitters 126 and 132.

Figure 3:
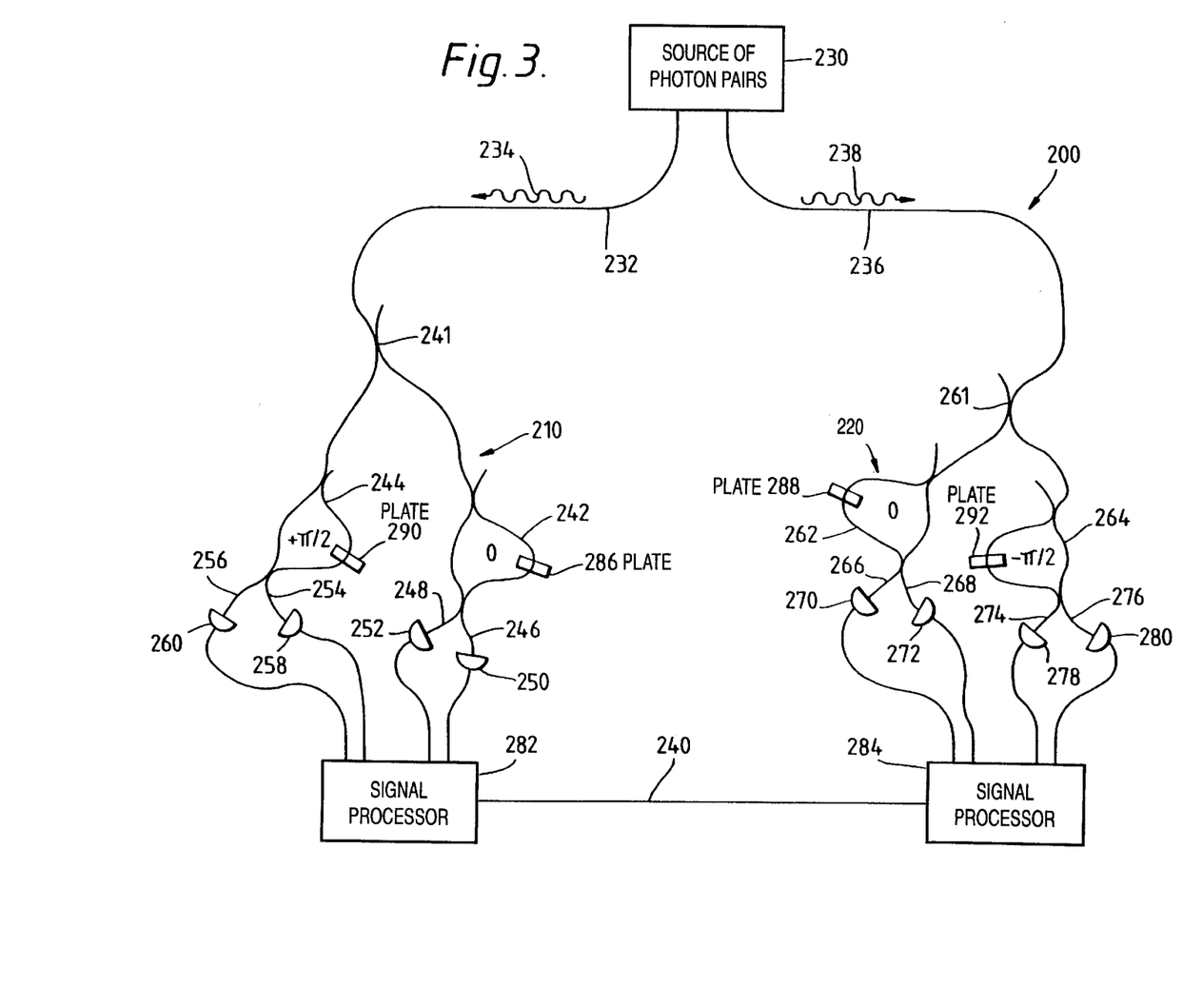
FIG. 3 schematically illustrates a communications system incorporating the receiver of FIG. 1.

Referring now to FIG. 3 there is shown a communications system, indicated generally by 200. The communications system comprises a first receiver 210 and a second receiver 220. The receivers 210 and 220 are like to the receiver 10. The system 20 further comprises a source of photon pairs 230. The source 230 emits pairs of photons, one of which is coupled to fibre optic guide 232, indicated by arrow 234, and one of which is coupled to fibre optic guide 236, indicated by arrow 238. Fibre optic guide 232 guides photons to the second receiver 220. The two receivers 210 and 220 communicate with each other via a conventional communications link 240 which may be a telephone connection.

The receiver 210 comprises a beam splitter 241, a first Mach-Zehnder interferometer 242 and a second Mach-Zehnder interferometer 244. Interferometer 242 has two output channels 245 and 246 which lead to photon detectors 250 and 252 respectively. Interferometer 244 has two output channels 254 and 256 which lead to photon detectors 258 and 260 respectively. Likewise, receiver 220 comprises a beam splitter 261, a first Mach-Zehnder interferometer 262 and a second Mach-Zehnder interferometer 264. Interferometer 262 has two output channels 266 and 268 which lead to photon detectors 270 and 272 respectively. Interferometer 264 has two output channels 274 and 276 which lead to photon detectors 278 and 280 respectively. The photon detectors 250, 252, 258, 260, 270, 272, 278 and 280 are actively quenched photon counting avalanche photodiodes, as described by Brown et al. in Applied Optics 26 (1987) page 2383. In response to a photon being detected these photon detectors emit an electrical pulse. Pulses originating from photon detectors 250, 252, 258 or 260 are detected by signal processor 282 and pulses originating from photon detectors 270, 272, 278 or 280 are detected by signal processor 284. Signal processors 282 and 284 exchange information via the conventional communications link 240. First interferometers 242 and 262 each have phase plates 286 and 288 respectively in their long arms which are set to give a relative phase shift of 0°. Second interferometer 244 has a phase plate 290 in its long arm set to give a relative phase shift of +π/2 radians and second interferometer 264 has a phase plate 292 in its long arm set to give a relative phase shift of −π/2 radians.

Figure 4:
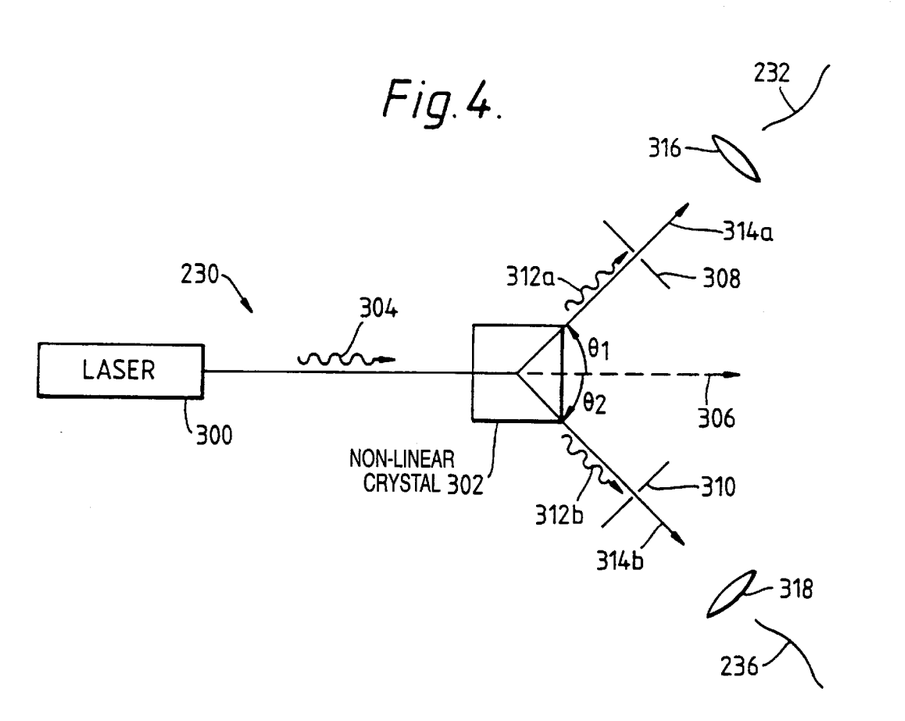
FIG. 4 illustrates a source of photon pairs for the FIG. 3 system.

Referring now to FIG. 4 there is shown in greater detail the source of photon pairs 230. The source 230 comprises a monochromatic laser 300 and a non-linear crystal 302. The laser 300 is a 100 mW krypton ion laser, operating at a wavelength $\lambda_o$ of 413.4 nm. The non-linear crystal 302 is a crystal of lithium iodate. The laser 300 emits pulses of photons such as photon 304 along a direction indicated by dashed arrow 306. In the crystal 302 the photons undergo non-degenerate down conversion, and correlated pairs of photons are emitted. Apertures 308 and 310 are arranged so that pairs of photons, such as photons 312a and 312b (these are labeled 234 and 238, respectively, in FIG. 3) are allowed to pass through. The photons 312a and 312b travel along directions indicated by arrows 314a and 314b respectively. Arrows 314a and 314b make angles $\theta_1$ and $\theta_2$ respectively with arrow 306. The photons 312a and 312b are a correlated pair with wavelength $\lambda_1$ and $\lambda_2$ respectively and are emitted from the crystal 302 substantially simultaneously with conjugate energies. The expression "conjugate energies" means that the sum of the photon pair energies is equal to the energy of the incident photon 304. The apertures 308 and 310 have a finite width, and they transmit photons emitted from the crystal 302 within a narrow range of acceptance angles. This range results in the transmitted photons such as photons 312a and 312b having a wavelength bandwidth $\delta\lambda$. The apertures 308 and 310 are arranged so that $\theta_1=\theta_2=14.5°$. Photons such as photon 312a have a wavelength of $\lambda_1 \pm \delta\lambda$, and photons such as photon 312b have a wavelength of $\lambda_2=\delta\lambda$ with $\lambda_1=\lambda_2=2\lambda_o=826.8$ nm. Photons such as photon 312a are coupled to fibre optic guide 232 by lens 316 and photons such as photon 312b are coupled to fibre optic guide 236 by lens 318.

Referring to FIG. 3 also, the operation of the communications system 200 will now be described. When photon 312a reaches the receiver 210 it may either pass to the first interferometer 242 or the second interferometer 244. Likewise, when the photon 312b reaches the receiver 220 it may either pass to the first interferometer 262 or to the second interferometer 264. The electrical pulses generated by the photon detectors 250, 258, 270 and 278 are allocated a binary value of 0 and pulses generated by the photon detectors 252, 260, 272 and 280 are allocated a binary value of 1. Individual photons are of uncertain wavelength and thus both photons 312a and 312b may pass to a photon detector from which the pulses correspond to either a 0 or a 1. The wavelengths of the photons 312a and 312b are correlated and so a correlation coefficient E may be derived relating the probability of photon 312a generating a particular binary value and the probability of photon 312b generating the same binary value.

The correlation coefficient is given by the expression:

$$E=\cos(\phi_1+\phi_2) \quad (1)$$

where $\phi_1$ is the phase shift of the phase plate 286 or 290 of the first receiver through which the photon 312a passes and $\psi_2$ is the phase shift of the phase plate 288 or 292 of the second receiver through which the photon 312b passes. When $(\phi_1+\phi_2)$ is equal to zero, E is equal to one, and photons 312a and 312b both pass to photon detectors which generate pulses with the same binary value.

After the photons 312a and 312b have been detected and the resulting electrical pulses have been measured by the signal processors 282 and 284, each signal processor sends to the other identification details of the interferometer through which the photon 312a or 312b passed. Both signal processors can then determine whether the value of the correlation coefficient E is equal to 1 or not. If E does equal 1, the measurements are valid and stored. For occasions where $(\phi_1+\phi_2)$ is not equal to zero, and therefore E is not equal to one, the measurements are discarded. The binary value of the valid measurement is common to both the first receiver and the second receiver. A series of these common binary values is built up from successive measurements and used as a key code for encoding communication between the two receivers over insecure public communications systems.

Figure 5:
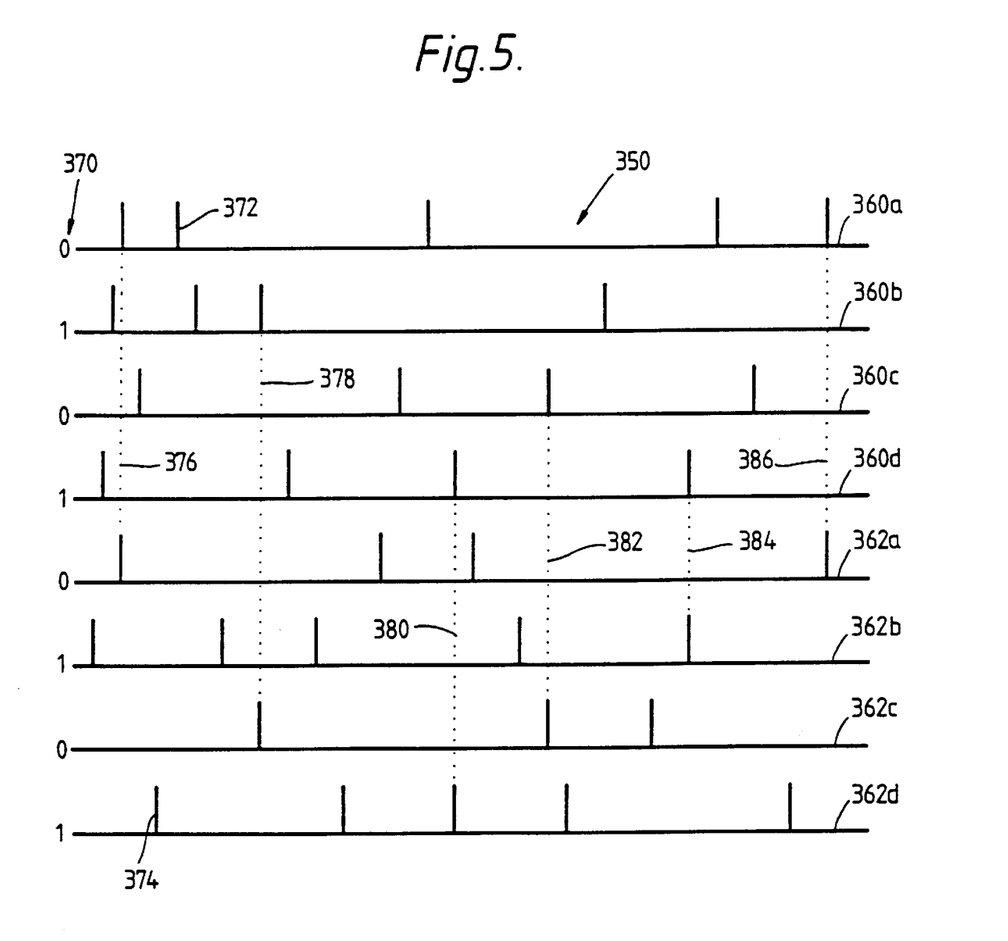
FIG. 5 is a timing diagram for the FIG. 3 system.

Referring now to FIG. 5 there is shown a timing diagram 350 of pulses measured by the signal processors 282 and 284. Timing diagram 350 is comprised of a series of graphs of pulse amplitude against time. Graphs 360a, 360b, 360c and 360d correspond to the outputs of photon detectors 250, 252, 258 and 260 respectively and graphs 362a, 362b, 362c and 362d correspond to the outputs of photon detectors 270, 272, 278 and 280 respectively. The binary value corresponding to the pulses from each detector are given in a column 370.

The timing diagram 350 shows several instances when the receiver 210 detects a photon but receiver 220 doe snot. Such an instance is shown by line 372. Likewise, there are several instances when receiver 220 detects a photon but receiver 210 does not, as shown by line 374. If one of the signal processors 282 and 284 measures a pulse but the other processor does not, the information is discarded.

Timing diagram 350 shows six instances, indicated by dotted lines 376, 378, 380, 382, 384 and 386 when both signal processors measure a pulse at the same instant. Of these six instances two occur when $(\phi_1+\phi_2)$ is not equal to zero. These are shown by dotted lines 378 and 384. These two measurements are discarded leaving four valid measurements. These four measurements indicated by dotted lines 376, 380, 382 and 386 enable both the signal processors 282 and 284 to obtain the four bit binary number 0100. In order for the signal processors to determine whether the pulses they both measure are due to a correlated photon pair they must also exchange information about the time the pulses were detected.

In order to ascertain whether an eavesdropper has attempted to intercept the transmission of photons, the two signal processors may exchange a predetermined random series of bits. If the exchanged series are not identical, an eavesdropper has been detected and secure communication is not possible. If the exchanged series are identical there is reasonable security that no eavesdropper is present, the remaining secret bits are used to form a shared random key code known only to the two signal processors. Public transmissions from one processor to the other are encoded and decoded with the key code.

Figure 6:
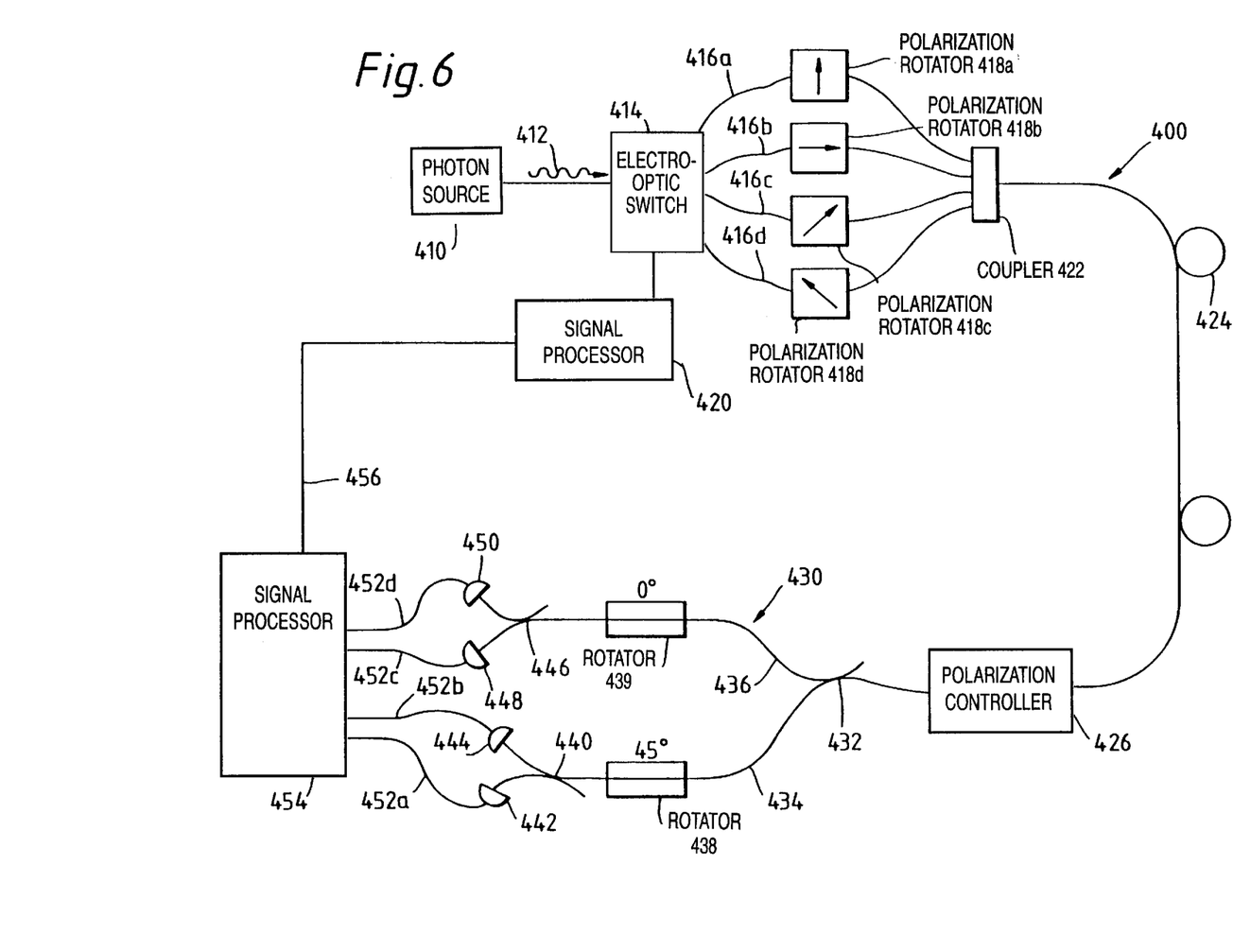
FIG. 6 schematically illustrates a communications system incorporating the receiver of FIG. 2.

Referring now to FIG. 6 there is shown a communications system incorporating the receiver of the invention, indicated generally by 400. Communications system 400 is a polarized photon communications system. The system 400 has a faint polarized photon source 410 which couples photons such as photon 412 to an electro-optic switch 414. The switch 414 routes the photon 412 to one of four channels 416a, 416b, 416c or 416d. Channels 416a to 416d each contain a polarization rotator. Channel 416a contains rotator 418a which rotates the photon polarization by 0°; channel 416b contains rotator 418b which rotates the polarization by 90°; channel 416c contains rotators 418c which rotates the polarization by +45° and channel 416d contains rotator 418d which rotates the photon polarization by −45° relative to its initial polarization. These rotations are indicated schematically. The rotators thus form two no-orthogonal sets of polarization orientations; rotators 418a and 418b form a rectilinear set having rotations of 0° and 90° and rotators 418c and 418d form a non-orthogonal diagonal set having rotations of +45° and −45°. In response to a control signal from a signal processor 420 and switch 414 routes the photon 412 to one of the four rotators 418a to 418d.

The four channels 416a–d recombine at passive coupler 422. The switch 414 and the coupler 422 both maintain the polarization orientation of photons as the photons pass through them.

The photon 412 passes from the switch 414 through one of the rotators 418a–d, where its polarization is rotated to the coupler 422. From the coupler 422, the photon 412 passes through fibre optic guide 424. The photon 412 then passes through a fibre optic polarization controller 426. The polarization controller 426 ensures that the emerging photon has a polarization reference frame which is identical to that when it entered the fibre optic guide 424. After the polarization controller the photon 412 passes to receiver 450. The receiver 430 is like to receiver 110. The photon 412 passes to a polarization maintaining fibre coupler 432 which couples the photon randomly either to channel 434 or channel 436. Channel 434 contains a 45° rotator 438 whilst channel 436 contains a 0° rotator 439. A photon in channel 434 then passes to a polarizing beamsplitter 440. Photons which have a vertical polarization after passing through the rotator 438 pass to detector 442 whilst photons having a horizontal polarization pass to detector 444. A photon in channel 436 then passes to a polarizing beamsplitter 446. Vertically polarized photons pass to detector 448 whilst horizontally polarized photons pass to detector 450. The rotators 438 and 439 impose non-orthogonal measurement bases on photons within channels 434 and 430 respectively. In response to a photon being detected by any one of detectors 442, 444, 448 or 450, an electrical pulse is passed along respective wires 452a, 452b, 452c or 452d to signal processor 454. Pulses from detectors 442 and 448 are assigned a binary number 0 and pulses from detectors 444 and 450 are assigned a binary number 1.

When the signal processor 454 measures an electrical pulse resulting from photon 412 being detected, it communicates to the signal processor 420 an identification of the channel the photon 412 passed through. The signal processor 420 communicates to the signal processor 454 using communications link 456 whether the photon 412 was routed by the switch 414 to one of the rotators 418a to 418d which resulted in either a rectilinear polarization or a diagonal polarization. If the photon 412 had a rectilinear polarization after passing through rotator 418a or 418b but was detected by receiver 430 in channel 434 the measurement is not valid. Likewise, if the photon passed through a diagonal rotator 418c or 418d but was detected by the receiver 420 in channel 436 the measurement is invalid. Valid measurements are those when the photon passes through a rectilinear rotator 418a or 418b and is detected in channel 436 or passes through a diagonal rotator 418c or 418d and is detected in channel 434. Invalid measurements are discarded.

The signal processor 420 controls which channel the switch 414 directs photon into. Of the two channels resulting in rectilinear polarization 416a and 416b, channel 416a corresponds to a binary 0 digit and channel 416b corresponds to a binary 1 digit. Similarly for the diagonal rotator channels 416c and 416d, channel 416c corresponds to a binary 1 digit and channel 416d corresponds to a binary 0 digit. The term "corresponds" means "equates in the signal processor 420". For valid measurements, both the signal processor 420 and the signal processor 454 have the same binary value, and these binary values are assembled to form a binary key code common to both processors. This key code is used to encode transmission over the communications link 456. A routine similar to that for system 200 may be used to detect an eavesdropper.

Figure 7:
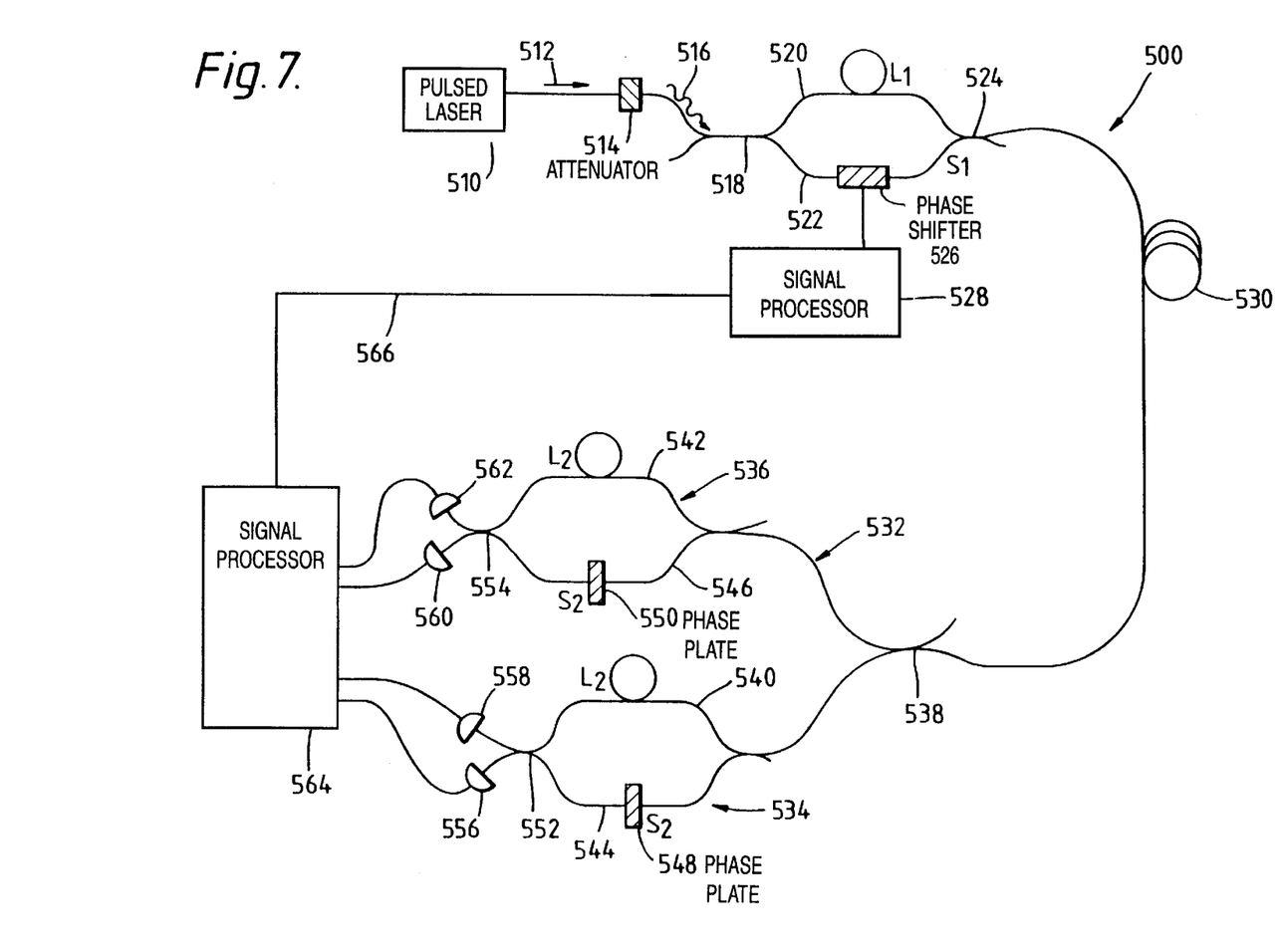
FIG. 7 illustrates a further communications system incorporating a receiver of the invention in the form of an extended time-division Mach-Zehnder interferometer.

Referring now to FIG. 7 there is shown a communications system incorporating the receiver of the invention, indicated generally by 500. The communications system 500 comprises an extended time-division Mach-Zehnder interferometer. A pulsed laser 510 produces a pulse of photons indicated by arrow 512. These photons pass to an attenuator 514. The attenuator 514 is arranged so that on average it transmits 0.1 photons per laser pulse, or for every 10 laser pulses only 1 will result in a single photon being transmitted. A single photon 516 passes to a first fibre coupler 518. The coupler 518 randomly couples photons such as photon 516 to either a long fibre path 520 or a short fibre path 522.

The two paths 520 and 522 recombine at fibre coupler 524. The short fibre path 522 contains a phase shifter 526 consisting of a free space link whose length is varied by means of a piezo-electric transducer (not shown) in response to a signal from signal processor 528. The signal from the signal processor 528 sets the phase shifter to one of four settings. These four settings introduce a relative phase shift of 0, $\pi/2$, $3\pi/2$, and $\pi$ radians respectively. The settings 0 and $\pi$ radians form a first measurement basis and the settings $\pi/2$ and $3\pi/2$ form a second non-orthogonal measurement basis. The phase shifter 526 may alternatively be an electro-optic phase modulator.

The long path 520 has a path length $L_1$ and the short path 522 has a path length $S_1$ with a path length difference $(L_1-S_1)$. The pulse of photons from the laser 510 has a duration of 30 ps and the difference in propagation time between photons passing along the short path 522 and the long path 520 is 1.1 ns, which is much greater than 30 ps. The repetition rate of the laser 510 is 105 MHz.

Photons such as photon 516 are coupled from the fibre coupler 524 to a transmission fibre optic guide 530 which may be greater than 10 km in length. The fibre optic guide 530 carries photons to a receiver 532 which is similar to the receiver 10. Photons such as photon 516 are coupled randomly to one of two filters 534 or 536 by fibre optic coupler 538. Filters 534 and 536 have long fibre paths 540 and 542 respectively of length $L_2$ equal to length $L_1$ and short fibre paths 544 and 546 respectively of length $S_2$ equal to length $S_1$. Short fibre path 544 contains a phase plate 548 set to give a relative phase shift to photons passing through it of 0 radians and short fibre path 546 contains a phase plate 550 set to give a relative phase shift of $\pi/2$ radians. Fibre paths 544 and 540 recombine at fibre coupler 552 and fibre paths 546 and 542 recombine at fibre coupler 554. Fibre coupler 552 couples photons such as photon 516 either to photon detector 556 or photon detector 558. Fibre coupler 554 couples photons such as photon 516 to photon detector 560 or photon detector 562. Photon detectors 556, 558, 560 and 562 are high-speed germanium avalanche photodiodes cooled to −196° C. (77 K) and operate in the Geiger mode with passive quenching via a 33 kΩ resistor.

Electrical signals from the photon detectors 556, 558, 560 and 562 produced as a result of photon detection are measured by signal processor 564. The signal processor assigns a binary 1 value to signals originating from detectors 556 and 560 and a binary 0 value to signals originating from detectors 558 and 562.

After the signal processor 564 has measured a signal coming from one of the photon detectors it communicates with the signal processor 528 via communications link 566, sending information about the time the photon was detected and from which filter 534 or 536 it was detected. The signal processor 528 informs the signal processor 564 whether it was a valid measurement. Valid measurements occur (a) when a photon is detected from filter 534 when the phase shifter 526 was set to 0 or $\pi$ radians for the transmission of that photon, and (b) when a photon is detected from filter 536 when the phase shifter 526 was set to $\pi/2$ or $3\pi/2$ radians.

If the measurement is valid the signal processor 564 stores the binary value corresponding to the signal received from the photon detector. The signal processor 528 also stores an equivalent binary value. The signal processor 528 equates signals setting the phase shifter to 0 and $\pi/2$ to a binary 0 setting and $\pi$ and $3\pi/2$ to a binary 1 setting. Both the signal processors 528 and 564 assemble an identical series of binary numbers and use this series as a key code for encrypting transmissions between the two signal processors over public communications link 566.

We claim:

1. A cryptographic receiver for receiving individual information carrying photons comprising:

a first photon channel and a second photon channel;

distributing means for distributing received photons between the first photon channel and the second photon channel;

means in the first photon channel for imposing a first measurement basis on photons within the first photon channel;

means in the second photon channel for imposing a second measurement basis on photons within the second photon channel, the first and second measurement bases being non-orthogonal;

photon detecting means for detecting received photons and for providing output signals upon detection of such photons; and signal processing means for receiving said output signals and signals from an external source and for generating a cryptographic key-code from a combination of said output signals and said signals from an external source such that the receiver and the external source share an identical key-code, wherein the distributing means distributes received photons randomly between the first and second photon channels without the requirement for a control signal, and the output signals from the photon detecting means are indicative of the respective measurement basis imposed on each received photon.

2. A cryptographic receiver according to claim 1, wherein respective interferometers in the first and second photon channels provide said means for imposing respective measurement bases.

3. A cryptographic receiver according to claim 2, wherein each interferometer is an unbalanced Mach-Zehnder interferometer.

4. A cryptographic receiver according to claim 3, wherein the interferometer in the first photon channel includes a photon path which imposes a radian phase change on photons passing along the photon path relative to photons passing along a like photon path of the interferometer in the second photon channel, where n is an integer.

5. A cryptographic receiver according to claim 4, wherein each interferometer has two output channels and each output channel leads to a respective photon detector, each photon detector providing one of said output signals.

6. A cryptographic receiver according to claim 5, wherein each photon detector is an actively quenched photon counting photodiode.

7. A cryptographic receiver according to claim 1, wherein the distributing means is a polarization maintaining channel divider.

8. A cryptographic receiver according to claim 7, wherein the first and second photon channels each include a respective polarization selective channel divider.

9. A cryptographic receiver according to claim 8, wherein at least one of the first photon channel and the second photon channel includes a polarization rotator.

10. A cryptographic receiver according to claim 9, wherein the first photon channel includes a first photon channel polarization rotator.

11. A cryptographic receiver according to claim 10, wherein the first photon channel polarization rotator rotates the plane of polarization of photons passing therethrough by 45°.

12. A cryptographic receiver according to claim 11, wherein each polarization selective channel divider has two output channels leading to respective photon detectors, the photon detectors providing said output signals, the output channel through which a particular received photon passes being dependent on the polarization state of that photon.

13. A cryptographic receiver according to claim 1, wherein the first and second photon channels comprise fibre optic waveguides.

14. A cryptographic receiver according to claim 1, wherein the receiver is incorporated within a communications system, the system including second signal processing means for providing said receiver with said signals from an external source.

15. A cryptographic receiver for receiving individual information carrying photons comprising:

a first photon channel and a second photon channel;

a coupler for distributing received photons between the first photon channel and the second photon channel;

a first rotator in the first photon channel for imposing a first measurement basis on photons within the first photon channel;

a second rotator in the second photon channel for imposing a second measurement basis on photons within the second photon channel, the first and second measurement bases being non-orthogonal;

photon detectors for providing output signals upon detection of such photons; and a signal processor for receiving said output signals and signals from an external source and for generating a cryptographic key-code from a combination of said output signals and said signals from an external source such that the receiver and the external source share an identical key-code, wherein:

the coupler distributes received photons randomly between the first and second photon channels without the requirement for a control signal, and the output signals from the photon detector are indicative of the respective measurement basis imposed on each received photon.

16. A cryptographic receiver according to claim 15, wherein the first and second rotators comprise first and second interferometers, respectively.

17. A cryptographic receiver according to claim 15, wherein the coupler is a polarization maintaining channel divider.

18. A cryptographic receiver according to claim 15, wherein the first and second photon channels comprise fiber optic waveguides.

19. A cryptographic receiver according to claim 15, wherein said receiver is incorporated within a communications system, said system including a second signal processor for providing said receiver with said signals from an external source.

* * * * *